US008351932B2

(12) United States Patent
Zabawskyj et al.

(10) Patent No.: US 8,351,932 B2
(45) Date of Patent: *Jan. 8, 2013

(54) METHOD AND SYSTEM FOR INTERNATIONAL ROAMING AND CALL BRIDGING

(75) Inventors: Bohdan Konstantyn Zabawskyj, Woodbridge (CA); Rubens Rahim, Markham (CA); Lucas Skoczkowski, Oakville (CA)

(73) Assignee: Redknee Inc., Mississauga (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/301,450

(22) Filed: Nov. 21, 2011

(65) Prior Publication Data

US 2012/0064868 A1 Mar. 15, 2012

Related U.S. Application Data

(60) Continuation of application No. 12/716,351, filed on Mar. 3, 2010, now Pat. No. 8,064,905, and a continuation of application No. 12/248,748, filed on Oct. 9, 2008, now Pat. No. 7,702,331, and a continuation of application No. 11/395,236, filed on Apr. 3, 2006, now Pat. No. 7,505,767, and a division of application No. 10/252,380, filed on Sep. 24, 2002, now Pat. No. 7,181,210.

(51) Int. Cl.
*H04Q 7/20* (2006.01)

(52) U.S. Cl. ............... 455/432.1; 455/432.2; 455/433; 379/114.05

(58) Field of Classification Search ............... 455/432.1, 455/432.2, 433, 558, 406; 379/114.05, 114.06
See application file for complete search history.

(56) References Cited

U.S. PATENT DOCUMENTS

| | | | | |
|---|---|---|---|---|
| 5,521,963 | A * | 5/1996 | Shrader et al. | 455/437 |
| 6,421,324 | B1 * | 7/2002 | Boyle et al. | 370/261 |
| 6,477,366 | B1 * | 11/2002 | Valentine et al. | 455/416 |
| 6,658,260 | B2 * | 12/2003 | Knotts | 455/466 |
| 6,684,072 | B1 * | 1/2004 | Anvekar et al. | 455/432.1 |
| 7,181,210 | B2 * | 2/2007 | Zabawskyj et al. | 455/432.1 |
| 7,330,725 | B2 * | 2/2008 | Zabawskyj et al. | 455/432.1 |
| 7,702,331 | B2 * | 4/2010 | Zabawskyj et al. | 455/432.1 |
| 2005/0238156 | A1 * | 10/2005 | Turner | 379/202.01 |
| 2009/0115836 | A1 * | 5/2009 | Zabawskyj | 348/14.08 |

OTHER PUBLICATIONS

U.S. Appl. No. 12/716,351, filed Mar. 3, 2010.

* cited by examiner

*Primary Examiner* — Minh D Dao

(74) *Attorney, Agent, or Firm* — Perry + Currier Inc.; Kristjan Spence

(57) ABSTRACT

Disclosed is an enhanced system and method for bridging calls across telecommunications networks, including an illustrative application of the invention as it relates to international roaming among prepaid wireless subscribers. For instance, whenever wireless subscribers roam internationally they may invoke the system by keying in an Unstructured Supplementary Service Data (USSD) short code followed by the number to be dialed. Said subscriber's prepaid account is then decremented in real-time (until such account is fully depleted). A key feature of the disclosure generally is the bridging of the call legs between the wireless subscriber initiating the telephone communication and that of the receiving party through a series of general purpose databases and computers without requiring modifications to existing core network or handset infrastructure.

6 Claims, 3 Drawing Sheets

METHOD AND SYSTEM FOR INTERNATIONAL ROAMING AND CALL BRIDGING

PRIORITY CLAIM

The present application is a continuation of U.S. patent application Ser. No. 12/716,351, filed Mar. 3, 2010, which is a continuation of U.S. patent application Ser. No. 12/248,478, filed Oct. 9, 2008, issued as U.S. Pat. No. 7,702,331, which is a continuation of Ser. No. 11/395,236, filed Apr. 3, 2006, issued as U.S. Pat. No. 7,505,767, which is a continuation of Ser. No. 10/252,380, issued as U.S. Pat. No. 7,181,210, the contents of all of which are incorporated herein by reference.

BACKGROUND ART

International roaming and more generically, the bridging of calls across telecommunications networks is well detailed in the prior art literature related and industry know-how. For instance, U.S. Patent Application Pub. No. 2002/0061745 by Ahn et al., entitled Roaming Service System for GSM Service Subscriber in CDMA Service Area, and Method for Registering Locations and Transmitting and Receiving Signals and Short Messages using the System, calls for the installation of a GSM-type SIM card into the CDMA terminal; our invention of present however remains independent of any such subscriber modification and/or registration.

Similarly, U.S. Pat. No. 6,075,855 to Christiansen et al., entitled Method of Accessing a SCP in an ISUP Network with Partial Release details art relevant to call set-up and clearing for intermediate access to a SCP in an ISUP network. Nevertheless, the art disclosed therein remains tied to the loop-back ('hairpin') trunk technique; a highly undesirable technique given today's telecommunications infrastructure, as it redundantly ties up trunks and related network resources. Indeed the art of the present invention remains independent of any such looping and goes beyond much of the obviousness of that disclosed art. Other related technology, as U.S. Pat. No. 6,393,289 to Bunting et al., entitled Apparatus, Method and System for Wireless Telecommunication Session Control by an Adjunct Network Entity, revolves around the interpretation of an ANSI-41 command by an network adjunct. Under that disclosure, the network adjunct will in turn allow the call to proceed, hair-pin the call, or invoke other ANSI-41 directives in order to instruct the switch to route the call without hair-pining the call through the network adjunct.

REFERENCES CITED

U.S. Patent Application
TABLE-US-00001 20020061745 May 2002 Ahn et al. 455/432 U.S. Pat. No. 6,393,289 May 2002 Bunting et al. 455/445 U.S. Pat. No. 6,075,855 June 2000 Christiansen et al. 379/209.01
Other References
GSM 03.90, Digital cellular telecommunications system (Phase 2+); Unstructured. Supplementary Service Data (USSD)—Stage 2
GSM 09.02, Mobile Application Part (MAP) specification 3GPP2 N.S0023, Network Support for MDN-Based Message Centers
TIA TR 45.2, IS-841, TIA/EIA-41-D Based Network Enhancements for MDN Based Message Centers
TIA/EIA ANSI-41 Cellular Radiotelecommunications Intersystem Operations

TECHNICAL FIELD

The present invention relates generally to wireless communications and services; and more specifically, to an improved method and system for the bridging of calls across telecommunications networks.

SUMMARY OF THE INVENTION

Particular attributes of traditional Intelligent Network (IN) environments have inherently constrained the development and geographic scope of applications which utilize the capabilities of today's networks. The asynchronous development cycles of traditional IN infrastructure vendors have led to variants in vendors' implementations of IN technologies. This point, as well as the inclusion of proprietary extensions to IN signalling protocols, have made interworking of IN services an ongoing issue faced by wireless carriers—particularly where interworking between a mix of vendor platforms is required. These limitations have effectively precluded the geographic scope of popular wireless 'prepaid' services to areas within the operating region of a given carrier where the carrier has deployed core network infrastructure (e.g. Home Location Registers (HLRs), Mobile Switching Centers (MSCs), Service Control Points (SCPs)) associated with a common vendor.

As such, the improved method and system for Call Bridging and International Roaming disclosed herein is an innovative network application, enabling prepaid subscribers to place calls whenever roaming out with their home network or in the invocation of other applications which involve bridging the subscriber to another subscriber or to a service provider.

Upon being initiated, the system sets up calls to both the originating and destination party, and bridges them together. The call bridge is in effect 'forced'.

Specifically, the calls are bridged using the switching fabric of a given Mobile Switching Center using the procedures and operations associated with the SS7 ISDN User Part (ISUP) protocols in an innovative manner as disclosed herein. An illustrative aspect of the disclosed art also permits mobile phone operators to log and transact calls made by prepaid subscribers when they are away from their home network-effectively expanding the geographic scope of prepaid wireless services.

Although the method and system disclosed, by and large employs a series of general purpose databases, filters and computers to achieve its ends, the bona fide distinctiveness of the invention resides in the so-called call setup module (CSM), which principally incorporates much of the functional and operative aspects of the invention.

A subscriber may invoke the call-bridging procedures by initiating a message to the CSM. A variety of mechanisms may be utilized by a given subscriber for the purpose of sending a message. These messaging mechanisms may include, but are by no means bounded by, Short Message Service (SMS), Unstructured Supplementary Service Data (USSD), Internet browser, or a voice-based call using Dual-Tone-Multi-Frequency (DTMF) Interactive Voices Response based technologies. The message may be routed directly via existing telephony protocols or may be routed indirectly via a messaging gateway. The information provided via the messaging mechanism will typically include the identity of the originating subscriber, the destination address, and the service to be activated.

The messaging gateway will also typically initiate the Call Bridging procedure via an Application Programming Interface (API) which will include a number of parameters including but not limited to the originating subscriber address, terminating subscriber address, and a transaction identifier. The purpose of the transaction identifier being to uniquely correlate a given request with other messages which may be received asynchronously including, but not limited to, a confirmation response. Practitioners skilled in the art shall recognize that a variety of object oriented application programming interfaces (e.g. Common Object Request Broker Architecture (CORBA), Extensible Markup Language (XML)) will serve the purpose of notification without affecting the intent and scope of the present invention.

The CSM may also autonomously initiate the call-bridging procedure via a request initiated by programmatic instructions stored in an software application resident in the CSM. For example, the CSM may invoke the call-bridging procedure at a given prescribed time in order to bridge a subscriber to a recording for a wake-up service stored in the CSM.

The CSM performs a syntax and validity check to determine if the request as received is well formed. It may also retrieve the subscriber's location in the Home Location Register (HLR) to assist the billing system in correctly rating the call. Additionally, the CSM is also responsible for normalizing the called number and for event logging.

Indeed, the CSM requests the initiation of two call attempts first to the subscriber (originating Mobile Station Integrated Services Digital Network Number (MSISDN)) and, on successful establishment, subsequently to the requested 'destination'. The call legs are each routed to a defined circuit of the ISUP loop around configured in the network by defining the CIC for the call legs as equivalent.

The Bridging method, and its non-limited illustrative application to International Roaming, specifically utilizes a Loop Around mechanism in order to leverage the inherent resilient switching fabric of the Network Operator's MSC. In a standard configuration a loop around facility is configured with an adequate number of circuits in order to accommodate the anticipated traffic requirements associated with the method. The MSC is configured to treat each end of the call as a trunk-group to a virtual MSC associated with a given SS7 point code (that is, from the perspective of the MSC, the loop-around facility is treated as two trunk-groups which terminate at another MSC).

The method will initially establish a call towards the originating mobile pre-paid subscriber utilizing the attributes (Circuit Identification Code) associated with one end of the loop-around facility. Note that from the perspective of the loop-around equipped MSC, the loop-around equipped MSC will appear to be receiving an ISUP call from another MSC. The loop-around equipped MSC will utilize its existing translation tables in order to direct the call via the appropriate out-bound facility in order to establish an ISUP call to the originating pre-paid mobile subscriber. Note that all ISUP traffic (e.g. the ACM, ANM, REL, RLC messages) associated with end of the loop-around facility which is used to establish a call to the originating subscriber will be terminated by the CSM. When the originating mobile subscriber has answered the phone, an ANM message will be received by the CSM. The CSM will in turn initiate the second leg of the call to the destination subscriber located in the PSTN (Public Switched Telephone Network) via the other end of the loop-around facility. The CSM will necessarily correlate the Circuit Identification Codes so that the same facility (time-slot) is utilized at each end of the loop-around trunk-group for a given call. The loop-around equipped MSC will similarly utilize its existing translation tables in order to direct the call via the appropriate out-bound facility to the destination subscriber via the PSTN. When the terminating PSTN subscriber has answered the phone, an ANM message will be received by the CSM. At this point in time, the loop-around equipped MSC will effectively bridge the calls together via the switching fabric of the loop-around equipped MSC and the correlated time-slot/facility of the loop-around trunk-group.

Should the destination number be otherwise busy, an audible busy signal from the receiver will be connected to the call originator. This connection will be kept shortly, and then released. A message shall then be delivered to the call originator in this case, indicating the destination number is busy. The message may be delivered via several mechanisms, including but not limited to, SMS, USSD, and Simple Mail Transfer Protocol (SMTP) based technologies.

Once the CSM detects a disconnection from either party by receiving an ISUP REL message, the CSM will complete the release sequence on that leg of the call as well as initiate a release sequence on the correlated facility on the other side of the loop-around trunk-group in order to release the circuit-switched facilities towards the other party. Note that if the release signal is initiated from the terminating PSTN subscriber, the CSM may optionally initiate an ISUP call origination sequence via the loop-around facility in order to direct the originating pre-paid subscriber to an IVR application for the purpose of receiving further instructions from the originating subscriber.

Indeed, these features and other such advantages of the present invention shall readily become apparent from the following description and accompanying drawings.

DETAILED DESCRIPTION OF THE PREFERRED EMBODIMENTS

Figure 1:
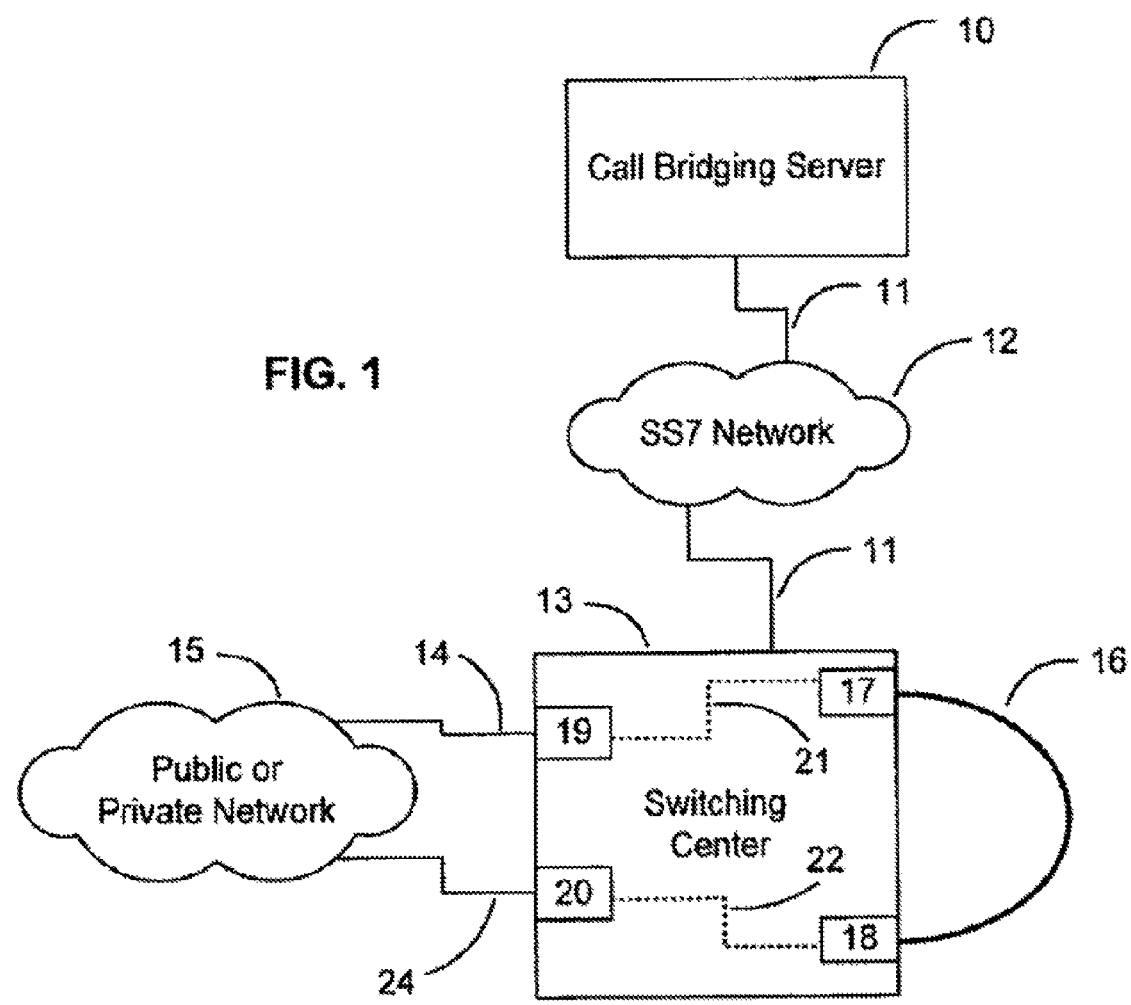
FIG. 1 illustrates a configuration of the call bridging method and system in a sample telecommunications system in accordance with a non-limiting embodiment of the present invention.

With reference now to FIG. 1, which presents a configuration of the invention in an exemplar telecommunications system. Members skilled in the art will appreciate that the illustrated network elements do not represent all of the physical nodes used to realize a public mobile telecommunications network. Indeed, those members shall also recognize that additional transport and signalling facilities may be utilized in order to establish connectivity among the network elements as generally described in standards and specifications including, but not limited to, ANSI-41 and GSM 9.02. Detailed depictions of well known architectures and network configurations are omitted so as not to obscure the art of the present invention with superfluous detail.

Again referring to FIG. 1, the SS7 12 network provides signalling connectivity among a number of network elements in the public network including Service Centers 13. Signalling connectivity via signalling interfaces and transport mechanisms 11 can also be provided by other protocols including the Stream Control Transmission Protocol (STCP) and Session Initiation Protocol (SIP) specified by the Internet Engineering Task Force (IETF). The Switching Center 13 provides for a source and sink of communications traffic as the Switching Center 13 serves subscribers (not shown) via land-line and mobile stations (not shown). The Switching Center 13 serves mobile stations (not shown) via base stations (not shown) and radio links (not shown). The connectivity between the mobile station and a given destination point such as another mobile station (not shown) or another fixed station (not shown) is provided via the Switching Center 13 which in turn provides SS7 connectivity and transport connectivity via the Public or Private Network 15 via bearer transport mechanisms (e.g. E1 or T1 based transport facilities) 14 24. The Switching Center 13 also serves to tandem traffic received from Public or Private Network 15 to another destination point (not shown) in the Public or Private Network 15 as well as alternative Switching Centers (not shown) or adjunct devices (not shown) which are directly interconnected with the Switching Center 13. The Call Bridging Server 10 has direct or indirect connectivity to the network elements of the telecommunications network including, but not limited to, the Switching Center 13 using industry standard protocols such as SS7 or SCTP.

Still in consideration of FIG. 1, the Switching Center 13 is equipped with a loop-around transport facility 16. The loop-around transport facility is a transport facility which provides connectivity between two ports 17 18 on the Switching Center 13. A given circuit or time-slot in the loop-around transport facility 16 is terminated to the ports 17 18 on the Switching Center 13. The circuit in the loop-around transport facility 16 is correlated to two unique SS7 ISDN User Part Circuit Identification Codes for the given Switching Center 13. Each port 17 18 which is associated with a given end-point of the loop-around facility is associated with a unique Circuit Identification Code. Those skilled in the art will recognize that several analogue or digital transmission systems may be used for the purpose of establishing the loop-around facility including those based on E1 and T1 transmission standards. Details pertaining to the electromechanical nature as well as encoding mechanisms associated with well known transmission mechanisms are omitted so as not to obscure the description of the present invention with unnecessary detail.

Still in consideration of FIG. 1, the Call Bridging Server 10 will initiate the call bridging procedure by initiating a call-set up procedure to a destination point served by the Switching Center 13 or by the Public or Private Network 15 via the switching fabric 21 and applicable interface port 19 of the Switching Center 13. The destination point may be a land-line or mobile station as well as a adjunct node which provides a telecommunications service (for example an interactive voice response based service). The Call Bridging Server will be equipped with a unique SS7 identifier (signalling point code) and will appear to be an adjacent adjunct to the Switching Center 10. Details associated with well known call establishment signalling mechanisms, operations, and procedures are omitted so as not to obscure the description of the present invention with unnecessary detail. The call-set up procedure will utilize an Initial Address Message (LAM) which will include a Circuit Identification Code (CIC) associated with one end of the loop around transport facility which in turn is associated with one port 17 on the Switching Center 13. The end of the loop around-facility associated with the initial call initiated by the Call Bridging server will be identified by a unique CIC for that Switching Center 13. From the perspective of the loop-around equipped Switching Center 13, the Switching Center 13 will appear to be receiving an LAM message associated with an incoming call from the Call Bridging Server 10. The loop-around equipped Switching Center 13 will utilize its existing translation tables in order to direct the call via its internal switching fabric 21 to the appropriate transport facility which may include an outbound transport facility 14 to a destination point in the Public or Private Network 15 or a termination point directly served by the Switching Center 13 (for example, a mobile station served by a base station). Subsequent call-establishment procedures involving the receipt and processing of SS7 call establishment messages associated with the call initiated by the Call Bridging Server 10, including but not limited to, the Address Complete Message (ACM) and the Answer Message (ANM) will be directed to the Call Bridging Server 10 via the Switching Center 13 and the SS7 Network 12. Each SS7 call establishment message associated with the call initiated by the Call Bridging Server 10 directed to the Call Bridging Server 10 will include the CIC associated with the circuit or time-slot of the loop around transport facility 16 which is terminated on the Switching Center 13 via a port 17. Subsequent to the destination point answering the call initiated by the Call Bridging Server 10, an ANM message will be received by the Call Bridging Server 10 message via the Switching Center 13 and SS7 Network 12. The Call Bridging Server will in turn initiate the second leg of the call to a second destination point served by the Switching Center 13 or by the Public or Private Network 15 via the switching fabric 22 and applicable interface port 20 of the Switching Center 13. The second destination point may be a land-line or mobile station as well as a adjunct node which provides a telecommunications service (for example an interactive voice response based service). The call-set up procedure will utilize an LAM which will include a second Circuit Identification Code (CIC) associated with the other end of the loop around transport facility which in turn is associated with a second port 18 on the Switching Center 13. The Call Bridging Server 10 will correlate the Circuit. Identification Codes associated with the loop-around facility so that the same circuit (time-slot) is utilized at each end of the loop-around trunk-group for a given call. From the perspective of the loop-around equipped Switching Center 13, the Switching Center 13 will appear to be receiving an IAM message associated with a second incoming call from the Call Bridging Server 10. The loop-around equipped Switching Center 13 will utilize its existing translation tables in order to direct the second call via its internal switching fabric 22 the appropriate transport facility which may include an outbound transport facility 24 to a destination point in the Public or Private Network 15 or a termination point directly served by the Switching Center 13 (for example, a mobile station served by a base station). Subsequent call-establishment procedures involving the receipt and processing of SS7 call establishment messages associated with the call initiated by the Call Bridging Server 10, including but not limited to, the ACM and the ANM will be directed to the Call Bridging Server 10 via the Switching Center 13 and the SS7 Network 12. Each SS7 call establishment message associated with the second call initiated by the Call Bridging Server (10) will include the second CIC associated with the circuit or time-slot of the loop around transport facility 16 which is terminated on the Switching Center 13 via a port 18. Subsequent to successful initial contact with the second destination point, an ACM message will be received by the Call Bridging Server 10 via the Switching Center 13 and SS7 Network 12. The initial destination point may be able to hear call progress tones (for example, ringing tone) at that point in time by virtue of the connectivity established in the Switching Center 13 via the connectivity established between two ports 19 20 via the switching fabric 21 22 and the loop around transport facility 17 connected to the Switching Center 13 via the facility termination ports 17 18. Subsequent to the second destination point answering the second call initiated by the Call Bridging Server 10, an ANM message will be received by the Call Bridging Server 10 message via the Switching Center 13 and SS7 Network 12. The leg of the call to the first destination party will be bridged to the leg of the call to the second destination party via the switching fabric 21 22 of the Switching Center and the loop-around transport facility 16. That is, the loop around transport facility 16 will bridge the two destination parties utilizing the switching fabric 21 22 of the Switching Center 13. The two parties may commence communications via the established bearer path which includes the two legs of the call initiated by the Call Bridging Server 10 and the loop-around transport facility. Subsequent to the release of a leg of the call via one of the destination parties, a Release Message (REL) will be will be received by the Call Bridging Server 10 message via the Switching Center 13 and SS7 Network 12 for the leg of the call associated with the initiated call release. The received REL message will contain the CIC associated with the leg and destination party which initiated call release. The Call Bridging Server will initiate call-release procedures for the other leg of the call by sending a REL message with a CIC associated with the port and leg of the call of the other destination party. Subsequent to the successful release of the call, a Release Complete (RLC) message will be received by Call Bridging Server 10 message via the Switching Center 13 and SS7 Network 12. The Call Bridging Server 10 will continue call-release procedures by sending a RLC message with a CIC associated with the port and leg of the call of the destination party which initiated the call-release procedure. Those skilled in the art will recognize that other SS7 messages may be initiated, propagated, and regenerated via the Switching Center 13 and Call Bridging Server without diluting the material aspects of the invention. Those skilled in the art will also recognize that the Call Bridging Server 10 may initiate the call termination procedure on either leg of the call based on programmatic instructions for a particular telecommunications service. For example, if it is determined that the account for a given telecommunications service has been depleted the Call Bridging Server 10 may terminate the service by initiating call release procedures for both legs of the call. Those skilled in the art will also recognize that the Call Bridging Server 10 may elect not to propagate call release procedures associated with one leg of a call and may initiate a call upon completing the call release procedures for a single leg of the call. For example, upon completing the call release procedures for one leg of the call, the Call Bridging Server 10 may initiate a call to a subsequent destination such as an Interactive Voice Response system for the purpose of relaying information or receiving further instructions from the subscriber connected to the loop around facility via the switching fabric of the Switching Center and outbound transport facility.

Figure 2:
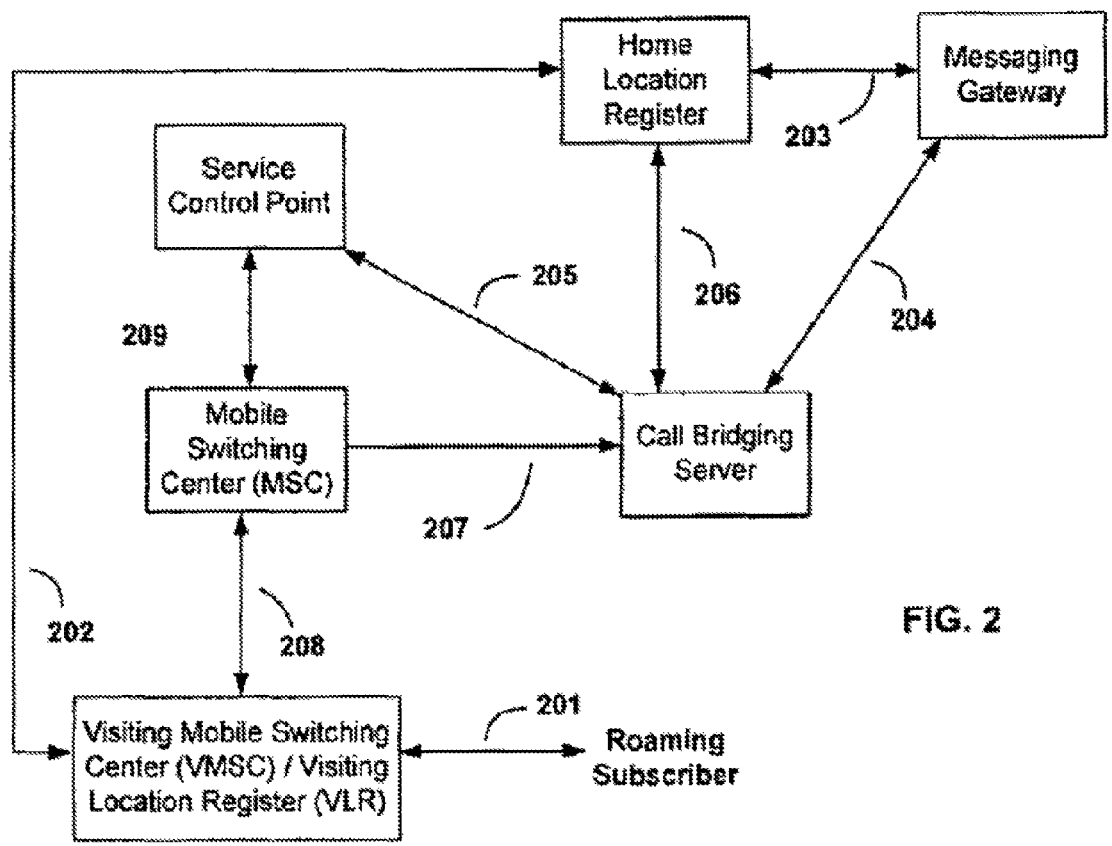
FIG. 2 illustrates a typical, non-limiting embodiment of the system level architecture employed in an exemplar articulation of the present invention involving call establishment procedures for prepaid mobile phones.

With reference to FIG. 2, whenever a prepaid wireless subscriber is roaming out with his/her home network they may invoke the system by keying in an Unstructured Supplementary Service Data (USSD) short code, *121* for instance, followed by the number to be dialed 201. The USSD message is automatically routed to the USSD Gateway 203 on the home network via the Visitor Location Register (VLR)/Home Location Register (HLR) 202. The USSD message is routed to the USSD gateway using the methods, operations, and protocols specified in GSM 03.90 and GSM 09.02 as amended from time to time. Details associated with well known message delivery methods and procedures are omitted so as not to obscure the description of the present invention with unnecessary detail. Those skilled in the art will recognize that a variety of alternative mechanisms may be utilized by a given subscriber for the purpose of invoking a service by sending a message. These mechanisms include, but are by no means bounded by, Short Message Service (SMS, Internet browser, or a voice-based calls using Dual-Tone-Multi-Frequency (DTMF) Interactive Voices Response based technologies.

Again with reference to FIG. 2, the call request is forwarded to the general purpose Call Bridging Server (which houses the Call Setup Module and the International Roaming Application—a specific instance of the Bridging application for illustrative purposes) 204. The request may be received via an Application Programming Interface (API) which will include a number of parameters including but not limited to the originating subscriber address, terminating subscriber address, and a transaction identifier. The purpose of the transaction identifier being to uniquely correlate a given request with other messages which may be received asynchronously including, but not limited to, a confirmation response. Practitioners skilled in the art shall recognize that a variety of object oriented application programming interfaces (e.g. Common Object Request Broker Architecture (CORBA), Extensible Markup Language (XML)) will serve the purpose of notification without affecting the intent and scope of the present invention. Those skilled in the art shall also recognize that the request may be received by the Call Bridging Server via telephony protocols as specified in GSM 03.90 and GSM 09.02 as amended from time to time. Details associated with well known message delivery methods and procedures are omitted so as not to obscure the description of the present invention with unnecessary detail.

Still in consideration of FIG. 2, where the account balance (query 205) is greater than a predesignated threshold the International Roaming Application (IRA) may initiate a Send Routing Information (SRI) message to the HLR with a view to obtaining the Mobile Subscriber Roaming Number (MSRN) and VLR for the said roaming subscriber 206. Keeping with this illustration, the (international roaming) bridging application also screens service access; dictating for example, that only certain numbers may be dialed, thereby preventing the very real and widespread concern among wireless providers for abuse of service and other instances of fraud.

Employing the subscriber/originator's MSISDN (or in alternate embodiments, the MSRN), the IRA formulates an ISUP Initial Address Message (LAM) message which is directed to the Mobile Switching Center (MSC) 207 via the SS7 network (not shown). The ISUP LAM message will contain a Called Party Number parameter which is set to the MSISDN (or in alternate embodiments, the MSRN) and will contain the CIC associated with one end of the loop-around arrangement.

Still in consideration of FIG. 2, The MSC then proceeds to establish the call to said roaming subscriber in Visited Mobile Switching Center (VMSC) 208 via the Public Switched Telephone Network (PSTN) (not shown).

The successful set-up of the first call leg triggers the International Roaming Application to initiate set-up of second call leg (not shown). Initiating the second call over the corresponding circuit of the loop around circuit bridges the two calls together and the called party on the first leg can hear the call progress (alerting) tones on the line). Said act thereof will further trigger to the Service Control Point (SCP) to verify sufficient balance 209, and initiates rating of the calls. In alternate embodiments, prefix digits are prepended to the destination number to aid the SCP in rating the call appropriately. In other alternate embodiments, the RA may directly adjust the account balance of the SCP via an interface and protocol supported by the SCP. Correspondingly, when either the first of second leg hangs up, the other leg of the call is also disconnected by the International Roaming Application (the MSC would trigger the SCP to stop rating the call, and deduct from the subscriber's account accordingly).

Figure 3:
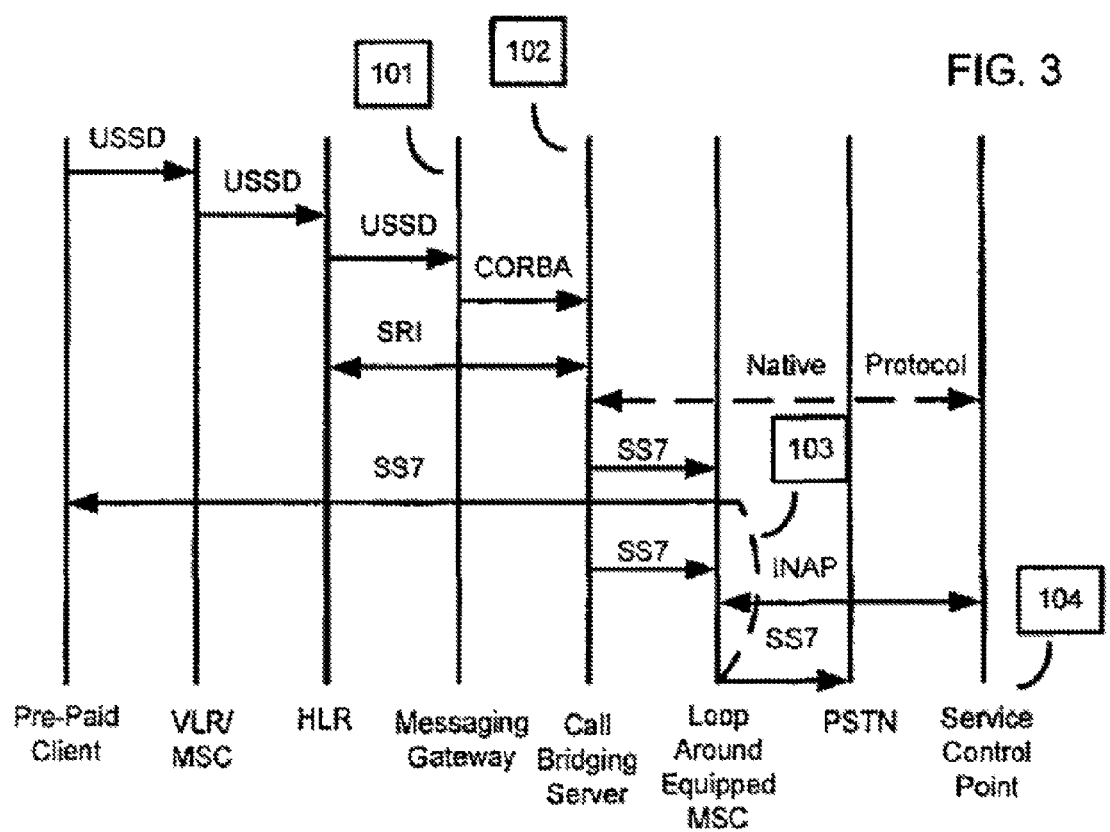
FIG. 3 details a non-limiting call-flow of a successful call set-up, illustrative of the bridging of the call legs in but one articulation of the present invention involving call establishment procedures for prepaid mobile phones.

Now in reference to FIG. 3, at 101 the subscriber initiates a USSD request which is relayed to the USSD Gateway via the SS7 network. The USSD Gateway transfers the request to the International Roaming Application (IRA); contained within which is the Call Control Module (CSM), which determines if said subscriber is within the designated serving region, and in alternate embodiments, the status and nature of the subscriber's balance 102.

Now still in consideration of FIG. 3, The IRA will initially establish a call towards the originating mobile pre-paid subscriber utilizing the attributes (i.e. Circuit Identification Code) associated with one end of the loop-around facility. Note that from the perspective of the loop-around equipped MSC, the loop-around equipped MSC will appear to be receiving an ISUP call from another MSC. The loop-around equipped MSC will utilize its existing translation tables in order to direct the call via the appropriate out-bound facility in order to establish an ISUP call to the originating pre-paid mobile subscriber via the PSTN. Note that all ISUP traffic (e.g. the ACM, ANM, REL, RLC messages) associated with the loop-around facility which is used to establish a call to the originating subscriber will be terminated by the CSM. The end of the loop around-facility associated the call established to the originating pre-paid subscriber will be identified by a unique CIC for that MSC. When the originating mobile subscriber has answered the phone, an ANM message will be received by the CSM. The CSM will in turn initiate the second leg of the call to the destination subscriber located in the Public Switched Telephone Network (PSTN) via the other end of the loop-around facility. The end of the loop around-facility associated the call established to the destination subscriber will be identified by a second unique CIC for that MSC.

The CSM will necessarily correlate the Circuit Identification Codes associated with the loop-around facility so that the same facility (time-slot) is utilized at each end of the loop-around trunk-group for a given call. The loop-around equipped MSC will similarly utilize its existing translation tables in order to direct the call via the appropriate out-bound facility to the destination subscriber via the PSTN. When the terminating PSTN subscriber has answered the phone, an ANM message will be received by the CSM. At this point in time, the loop-around equipped MSC will effectively bridge the calls together via the switching fabric of the loop-around equipped MSC and the correlated time-slot/facility of the loop-around transport facility 103.

The originating party will be able to hear the usual call progress tones upon receipt of the second ACM at the loop-around equipped MSC. The account associated with the originating subscriber (where prepaid) is decremented using standard CAMEL/INAP messaging sequences on the so-called 'PSTN' side of the call. In alternate embodiments, the destination number may optionally be prefixed to invoke a special charge in the SCP. In other alternate embodiments, the CSM may directly adjust the subscriber balance via a protocol and interface supported by the SCP.

At 104, the call is connected.

While the foregoing describes what are considered to be the preferred embodiments of the invention, it is understood that various modifications may be made therein and that the invention may be implemented in various forms and alternate embodiments, and indeed that it may be applied in numerous applications, only some of which have been described. The claims are intended to cover all such modifications and variations which fall within the true scope of the invention.

The invention claimed is:

1. A method for initiating and rating calls across telecommunications networks, said method comprising:
   receiving and handling a request from a first mobile station at a call bridging server, said request for initiating a voice call to a second mobile station and being formed using at least one of Short Message Service (SMS), Unstructured Supplementary Service Data (USSD), Internet browser, or a voice-based call;
   initiating a first call leg from said bridging server to said first mobile station;
   initiating a second call leg from said bridging server to said second mobile station; and,
   joining said first call leg with said second call leg at said bridging server to complete said voice call.

2. The method of claim 1 wherein said request is formed using Short Message Service (SMS).

3. The method of claim 1 wherein said request is formed using Unstructured Supplementary Service Data (USSD).

4. The method of claim 1 wherein said request is formed using an internet Browser.

5. The method of claim 1 wherein said request is formed using a voice-based call.

6. The method of claim 1, further comprising:
   determining whether an account balance associated with one of said first mobile station and said subscriber is greater than a predesignated threshold.

* * * * *